United States Patent [19]

Calvert et al.

[11] 4,247,308
[45] Jan. 27, 1981

[54] PREFORMED-SPRAY SCRUBBER

[75] Inventors: Seymour Calvert; Ronald G. Patterson, both of San Diego, Calif.

[73] Assignee: Air Pollution Technology, Inc., San Diego, Calif.

[21] Appl. No.: 47,212

[22] Filed: Jun. 11, 1979

[51] Int. Cl.³ .................. B01D 53/32; B01D 47/06; B03C 3/01

[52] U.S. Cl. .................. 55/8; 55/10; 55/90; 55/94; 55/107; 55/122; 55/124; 55/129; 55/257 R; 55/260; 55/418; 55/465; 55/468; 261/116

[58] Field of Search ............. 55/92, 94, 107, 237–238, 55/241, 257 R, 260, 465, 468, 8, 10, 90, 122, 124, 129, 418; 261/74, 115, 116

[56] References Cited

U.S. PATENT DOCUMENTS

| 1,687,542 | 10/1928 | Carrier | 261/115 |
| 1,845,750 | 2/1932 | Hillery | 261/116 |
| 1,940,198 | 12/1933 | Wagner | 55/107 X |
| 2,045,519 | 6/1936 | Coutant | 55/257 R X |
| 2,083,002 | 6/1937 | Branche et al. | 261/115 X |
| 2,124,290 | 7/1938 | Fleisher | 261/115 |
| 2,353,815 | 7/1944 | Dicke | 55/468 X |
| 3,686,833 | 8/1972 | Rush | 261/116 X |
| 3,729,898 | 5/1973 | Richardson | 55/107 X |

FOREIGN PATENT DOCUMENTS 1292192 10/1972 United Kingdom ............ 55/107

Primary Examiner—Kathleen J. Prunner
Attorney, Agent, or Firm—Richard H. Zaitlen

[57] ABSTRACT

A pre-atomized spray scrubber and related method is disclosed. The scrubber has special utility in the removal of particulate and gaseous contaminants from a gas stream and comprises a housing defining a flow path therethrough. The housing is divided into first and second sections by a deck which is configured such that as the gas stream flows through the first section, it flows across the deck and then into the second section. A series of liquid spray nozzle banks are disposed in the housing, either in the first or second section and are arranged and configured so as to aid in directing the gas stream from the first section into the second section. An entrainment separator is also preferably disposed in the housing to further aid in the removal of the contaminants from the gas stream.

27 Claims, 5 Drawing Figures

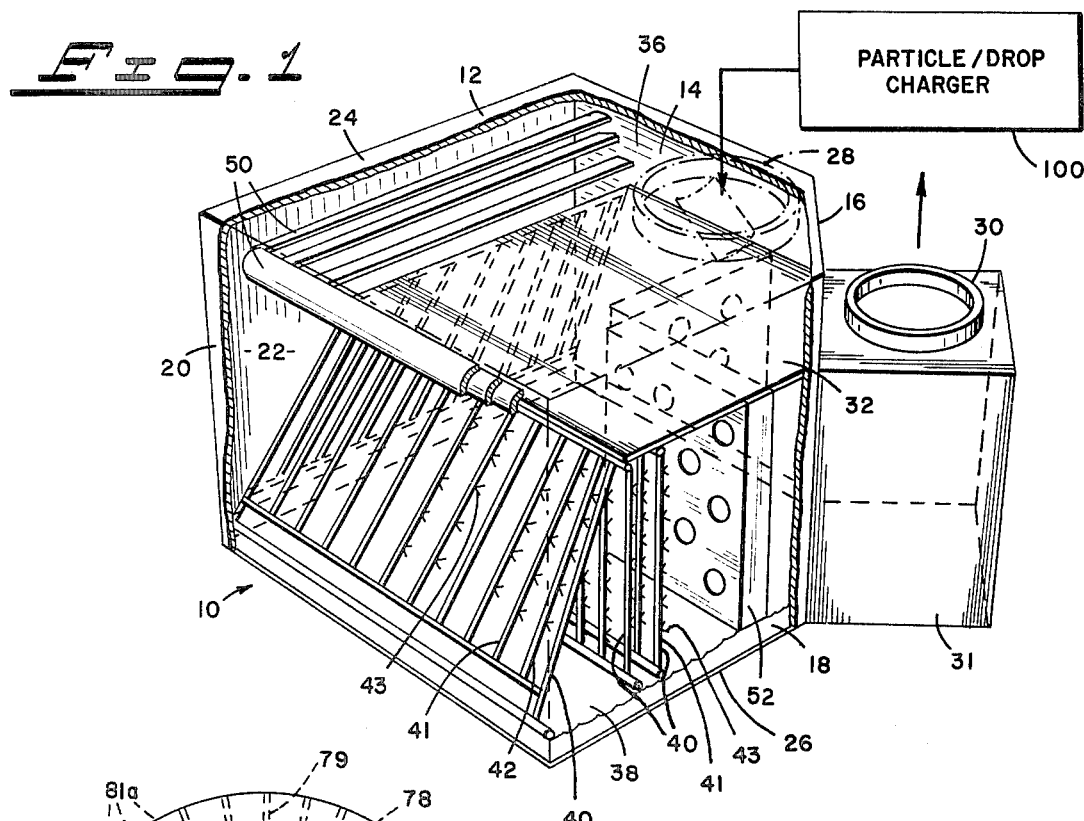
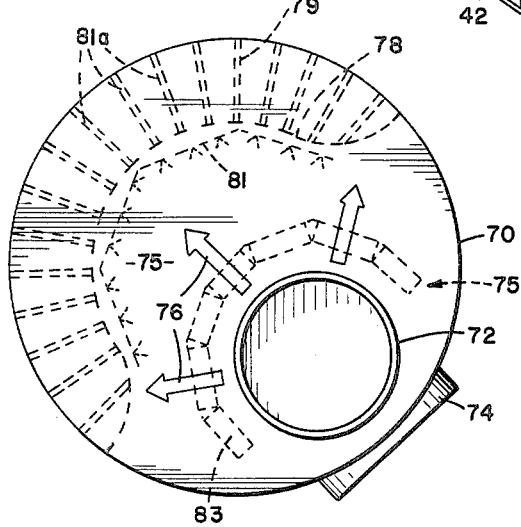
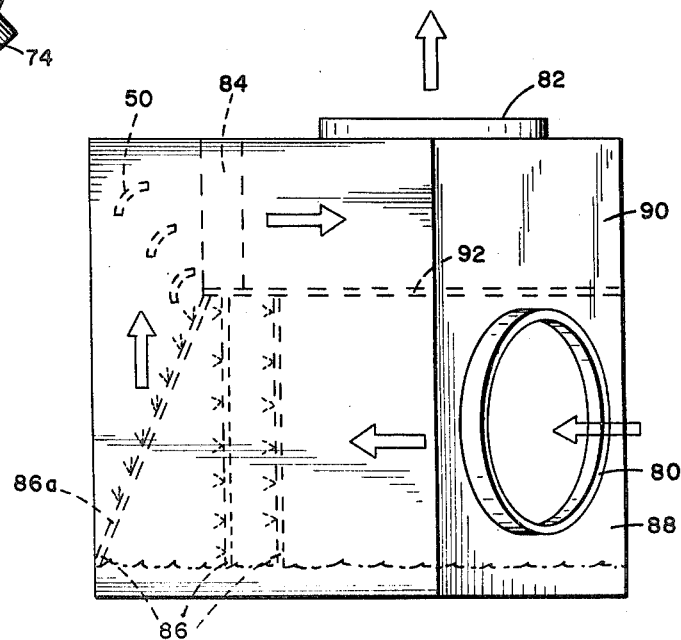

PREFORMED-SPRAY SCRUBBER

BACKGROUND OF THE INVENTION

1. Field of the Invention

This invention relates to the field of air pollution control equipment, and more specifically to a preformed-spray scrubber having special utility for the removal of particulate and/or gaseous contaminants from a gas stream.

2. Prior Art

Many types of scrubber devices are presently available for removing various contaminants such as finely divided dust particles, gases and the like from a gas stream. One type of scrubber is called a preformed-spray scrubber. A preformed-spray scrubber collects particles or gases on liquid drops that have been atomized by spray nozzles. The properties of the droplets are determined by the configuration of the nozzles, the liquid to be atomized and the pressure to the nozzles. Sprays leaving the nozzles are directed into a chamber that has been shaped so as to conduct the gas past the atomized drops. In the past, horizontal and vertical gas flow paths have been used, as well as spray-entry flowing co-current, counter-current or cross-flow to the gas stream. In a typical situation, the relative velocity between the drops and the gas is ultimately determined by the terminal settling velocity of the liquid drops.

Ejector venturis are preformed-spray devices in which a high-pressure spray is used both to collect particles and move the gas stream. High relative velocity between the drops and the gas stream aids particle separation. Preformed-sprays have also been installed in venturi scrubbers which use a fan to provide high gas-phase pressure drop. Particle collection in these units results from inertial impaction on the drops. Efficiency is believed related to a complex function of drop size, gas velocity, liquid-gas ratio, and drop trajectories. There is often an optimum droplet diameter which varies with fluid-flow parameters. For drops falling at their terminal settling velocity, the optimum droplet diameter for fine-particle collection is around 100-500 $\mu$m; for drops moving at high velocity within a few feet of the spray nozzle, the optimum is smaller.

Spray scrubbers are believed to be practically immune to plugging on the gas-flow side, but are subject to several problems on the liquid side. The liquid-gas ratio required is high; usually running 30–100 gallons per 1,000 cubic feet of gas treated, depending on efficiency. The sprays generate a heavy loading of liquid entrainment which must then be collected.

Most of the energy is put into the liquid sprays which can be configured so as to sweep the gas toward the exit. Gas-phase pressure drop ($\Delta P$) is therefore low or may even be positive.

In addition to the above problems, there are yet other problems associated with preformed-spray scrubbers. More specifically, it is desirable to limit the gas velocity so as to maintain the maximum relative velocity between the sprays and the gas stream. This requires that the cross sectional area for gas flow in the spray zone in the scrubber be fairly large. Such a large cross sectional area thus requires a large chamber, which is a significant shortcoming associated with prior art designs. Further, high gas velocities can cause distortion of the spray pattern so that there is not good coverage of the gas stream by the sprays. High gas velocity also causes increased entrainment of drops from the spray zone which thereby increases the performance required in the entrainment separator. In addition, high gas velocities generally adversely affect the capacity of typical entrainment separators. Finally, the transition from inlet ducting to the spray zone and from the spray zone to the outlet ducting presents a substantial problem in scrubber configuration and necessitates the dedication of a considerable fraction of the scrubber volume to this function.

The present invention is directed to an apparatus and related method which overcome a number of problems associated with the prior art. Further, the present invention has a relatively straightforward design making it easier to construct and install.

SUMMARY OF THE INVENTION

Broadly, the present invention is directed to a preformed-spray scrubber and related method particularly adaptable for removing finely divided particulate and/or gaseous contaminants from a gas stream. The scrubber comprises a generally rectangular housing defining a flow path therethrough and having a gas inlet orifice and a gas outlet orifice. The housing is divided into first and second sections by a deck configured such that the gas stream flows through the first section, adjacent the deck, and into the second section. Preferably, the second section is located directly beneath the first section. The gas flow through the first section is controlled such that it fans out in a radially divergent pattern across the deck and then vertically downward into the second section.

A series of nested spray nozzle banks are disposed in the second section of the housing beneath the deck. The series of spray nozzle banks can be configured such that the spray from the nozzles aids in changing the direction of the gas as the gas flows from the first section to the second section. More specifically, the nozzles are configured so as to encourage the gas moving in a generally vertical path as it enters the second section to a generally horizontal path which radially converges on the outlet.

An entrainment separator is preferably disposed in the second section of the housing between the spray nozzle banks and the outlet. The entrainment separator of the type used herein is well known in the art and is used to further separate any remaining contaminants in the gas stream prior to the gas stream exiting from the housing.

In terms of operation, the gas stream flows into the scrubber housing in a vertically downward direction through an opening which is located off the center of the horizontal cross-section of the scrubber. The gas flow direction is changed by baffles, turning vanes or sprays such that the gas stream flows in a horizontal direction above the internal deck which divides the scrubber into upper and lower sections. Baffles, turning vanes or sprays may also be used to aid in obtaining more uniform gas flow distribution in the upper section of the scrubber. Sprays of water or other liquid may be utilized in the upper section to cause saturation of the gas and preconditioning of the particles. Some particle collection and mass transfer occurs in the upper section due to the sprays, impingement on the deck and collection on the walls in the internal structure of the upper section.

As the gas flows through the upper section, it diverges such that the gas velocity decreases. The gas stream is then directed downward across a substantial fraction of the scrubber's internal perimeter and into the lower section. The flow from the upper section to the lower section is through a flow-through channel created between an edge of the deck and the internal wall of the scrubber. Baffles, turning vanes or sprays may be used in the flow through channel to promote even gas flow.

After the gas stream enters the lower section of the scrubber, it is again diverted approximately 90 degrees such that the gas stream flows in a horizontal direction in a generally convergent pattern toward the entrainment separator. This action is aided by the series spray banks disposed in the lower section. The series of spray banks creates a "spray zone" in the housing. The spray banks are also configured to aid in uniform gas flow distribution in the lower section of the scrubber.

The gas then flows from the spray zone through an entrainment separator, whose configuration also aids in maintaining a uniform gas flow pattern, to the gas outlet. Here the now-purified gas is discharged to the atmosphere.

By the use of the scrubber device of the present invention, uniform gas flow is maintained in both the upper and lower sections. Further, gas flow rates are controlled to improve the functioning of the entrainment separator. Other advantages, such as improved particle collection by inertial impaction and the like are also achieved.

The novel features which are believed to be characteristic of the invention, both as to its organization and method of operation, together with further objectives and advantages thereof will be better understood from the following description considered in connection with the accompanying drawings in which a presently preferred embodiment of the invention is illustrated by way of examples. It is to be expressly understood, however, that the drawings are for the purpose of illustration and description only and are not intended as a definition of the limits of the invention.

BRIEF DESCRIPTION OF THE DRAWINGS

FIG. 1 is a perspective view showing the first embodiment of the scrubber device of the present invention;

FIG. 4 is a top plan view of a second embodiment of the scrubber device of the present invention;

FIG. 5 is side view of a third embodiment of the scrubber device of the present invention.

DETAILED DESCRIPTION OF THE INVENTION

Figure 2:
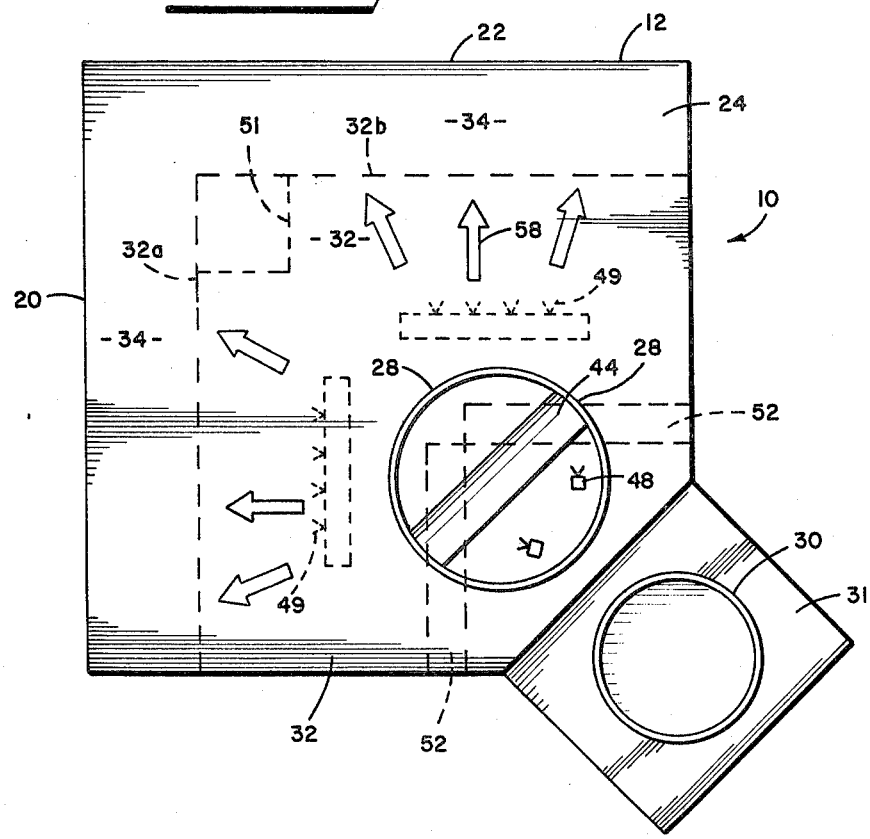
FIG. 2 is a top plan view of the first embodiment of the present invention.
Figure 3:
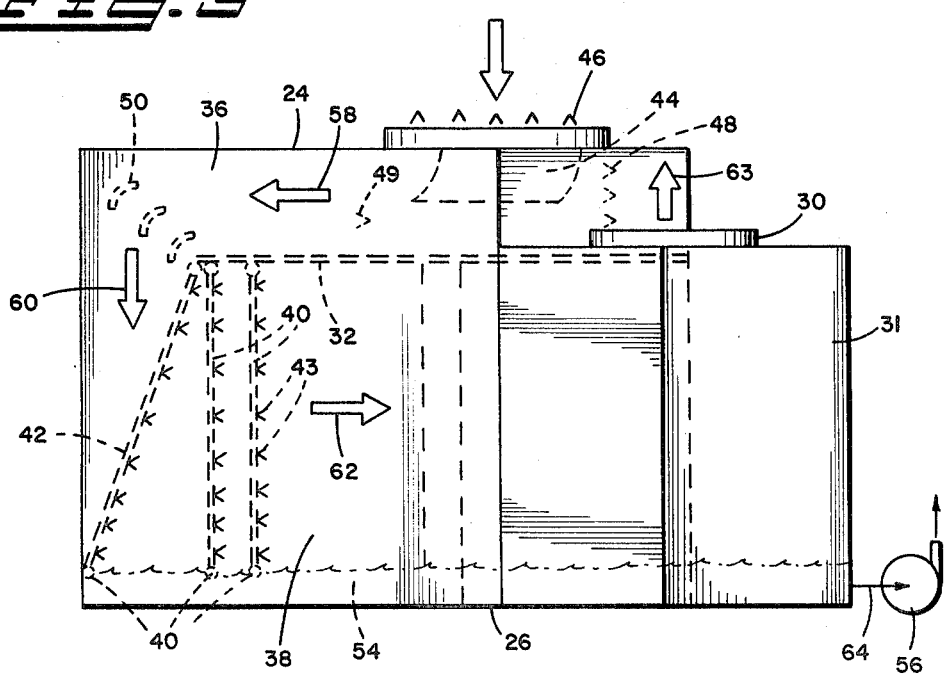
FIG. 3 is a side view of the first embodiment of the present invention.

Referring first to FIGS. 1, 2 and 3 there is shown, as a first embodiment, the scrubber device 10 of the present invention. In the first embodiment, the scrubber 10 is comprised of a generally rectangular closed housing 12 having generally vertical walls 14, 16, 18, 20 and 22, as well as a top 24 and bottom 26. A generally circular inlet orifice 28 is disposed through top 24 and a generally circular outlet orifice 30 is disposed on an outlet chamber 31. Chamber 31 is in flow communication with and is considered part of housing 12. Located within the housing 12 is a flat, horizontal deck member 32. Deck 32 is joined to walls 14, 16, 18. Edges 32a and 32b of deck 32 are not joined to any walls and form two continuous right-angled sections of flow through channel 34 between an upper first section 36 and a lower second section 38 in the housing 12. Flow through channel 34 permits a gas stream to uniformly flow from the first section 36 to the second section 38.

A series of liquid spray nozzle banks 40 are disposed in the second section 38. Each nozzle bank 40 is comprised of a plurality of elongated tubes or conduits 41, with each conduit 41 having a plurality of spray nozzles 43 disposed along the length thereof. Preferably at least two spray banks 40 are used, with at least one of the spray banks indicated as spray bank 42, inclined generally toward the bottom of the housing 12 and located beneath the flow through channel 34. Liquid is supplied to each spray bank 40 from a central feed line (not shown), or other similar system. It is to be noted that conduits 41 are vertically disposed in the second section 38. They could also be horizontal. Spacing between each spray bank 40 and between conduit 41 in any one bank is selected such that the spray from each nozzle 43 forms a "nested" and overlapping configuration.

Referring now to FIGS. 2 and 3, one can see that there are vanes or baffles 44 (only one being shown) preferably disposed adjacent the inlet 28 which aid in horizontally directing the stream of gas into the first section 36 as hereinbelow described. In addition, sprays 46, 48 and 49 are located either above and/or below the inlet orifice 28 and are used to pretreat the gas as it enters the housing 12. These sprays can also be used instead of baffles 44 so as to help the gas flow horizontally through the first section 36. Sprays 48 and 49 are located above deck 32 and are configured such that the liquid spray tends to sweep the gas stream in a divergent direction toward edges 32a and 32b, respectively.

Also disposed in the first section 36 are vanes or baffles 50 which aid in directing the gas from the first section 36 to the second section 38 as hereinbelow described. Note that baffles 50 are preferably located along the length and generally above each edge 32a and 32b. Baffles 51, shown in dashed lines in FIG. 2, are located beneath deck 32, and are configured to encourage any gas flowing over the corner between edge 32a and 32b to flow through spray banks 40. Baffles 51 will be discussed in greater detail below.

In the second section 38 one can see the spray banks 40 as well as entrainment separator 52. Entrainment separator 52 may be any of the well known entrainment separators. The placement, however, of entrainment separator 52 is not a mere matter of choice. Rather, entrainment separator 52 is preferably positioned between the spray banks 40 and the outlet 30 such that the two generally rectangular sections of entrainment separator 52 are disposed at approximate right angles to the flow path of the gas as it flows through the second section 38. More specifically, the configuration of the entrainment separator 52 is such that the flow path of the gas is convergent as it approaches and leaves the entrainment separator 52. It is to be understood, of course, that other configurations for entrainment separator 52 can be used so long as a converging flow path is maintained.

Before the gas flows through the separator, however, it must flow around each edge 32a and 32b, and through the spray zone created by the associated spray nozzle bank 40 located beneath each edge 32a and 32b. Because one spray bank, referred to herein as spray bank 42, is mounted at an angle, as the gas stream flows over edges 32a and 32b, spray from the associated nozzles 43 encourages the gas stream to flow uniformly beneath deck 32. This means that all those liquid sprays adjacent deck 32 will now contact the gas stream. Without spray bank 42, it is believed that the gas stream would not be uniformly contacted by the liquid sprays, especially those directly beneath deck 32.

The operation of the first embodiment of the device of the scrubber 10 of the present invention will now be set forth.

Initially, the gas stream is directed through the inlet 28. The gas stream may be directed toward the flow-through channel 34 by the use of flow guide vane and baffle 44. In addition, or in substitution, water sprays or jets 46, 48 or 49, or a combination of these can also be used to so direct the gas stream along a horizontal path through the first section 36. In this manner, a uniform flow distribution from the inlet 28 to the flow through channels 34 is achieved. Uniform gas flow in section 36 is desirable as this helps insure more uniform flow through the entire scrubber 10, and thus between interaction with the spray bank 40 and the entrainment separator 52. Further, use of liquid sprays in section 36 also pretreats the gas and helps promote particle collection and mass transfer. As indicated in FIG. 2, the direction of gas flow is radially outward across the deck 32 as indicated by arrows 58.

As the gas stream flows through section 36, large particles are removed from the gas stream by impingement and sedimentation on the deck 32 and any baffles or other structure located in this section. Additional particle collection occurs on any liquid sprays which are utilized in section 36. Mass transfer also occurs between the gas and any wetted surface and thus if water sprays are used in section 36, deck 32 will become such a wetted surface.

When the initial horizontal gas flow in the first section 36 reaches the edges 32a and 32b of deck 32, it is deflected vertically downward through the flow-through channels 34 and into the second section 38. This change of direction from vertical to horizontal may be aided by the use of turning vanes or baffles 50 or by the use of liquid sprays. In the preferred embodiment the gas stream flows through channels 34 formed between the unattached edges 32a and 32b of deck 32 and the inner surface of housing 12. Other forms of channels are also within the scope of this invention. For example, holes, slots, etc. could be disposed through deck 32 adjacent to walls 20 and 22 of the scrubber 10.

Without any sprays in section 38, much of the gas would flow adjacent the bottom 26 of the housing 12. The present invention enables much improved contaminant collection to be achieved by the use of spray banks 40 and the spray zone created thereby. Further, the spray from the spray bank 40, and more specifically, bank 42, aids in turning the gas flow from a generally downward and vertical direction indicated by arrow 60 in FIG. 3, to a horizontal direction indicated by arrow 62. In addition, the sprays also transfer momentum to the gas in the horizontal direction 62 as the gas flows through the second section 38. Spray from spray banks 40 also cause particle collection and mass transfer to occur.

To promote more uniform contacting of gas with spray, baffles 51 are located beneath deck 32 adjacent the corner formed between edges 32a and 32b. Baffles 51 are preferably solid walls extending from the lower surface of deck 32 to the scrubber bottom 26 and prevent gas from flowing through the corner region of section 38. This corner baffling arrangement also permits the use of a comparatively simple and regular spray piping arrangement which does not have to extend into the corner region. Note also that the configuration of baffles 51 helps support deck 32.

The first bank of sprays encountered by the gas stream in the second section 38 as it flows over edges 32a and 32b is spray bank 42. Spray bank 42 is located along the plane from the bottom edge of the scrubber 10 adjacent walls 20 and 22 to edges 32a and 32b of the deck 32. Generally, this location for bank 42 is also the plane of intersection between the downward flow 60 and the horizontal flow 62 through the second section 38. The location of spray bank 42 is believed to cause a more uniform gas flow distribution through section 38 than if all the spray banks were arranged along a vertical plane. Uniform distribution of the gas stream both in the horizontal and vertical directions helps to promote the removal of the contaminants by interaction with the liquid sprays.

The liquid from the various spray nozzles 43, as well as sprays 46, 48 and 49 is shown as collecting adjacent the bottom 26 of the scrubber 10 as liquid 54. Liquid 54, in one embodiment, flows out of the scrubber 10 through pipe 64 to pump 56 which pumps it back to the spray piping system (not shown). The pumping system would deliver the liquid to the spray nozzles as required. In another embodiment, the liquid 54 could be collected by an external liquid sump.

After the gas stream has flowed through the spray banks 40, it flows in a generally converging direction toward the entrainment separator 52. As shown in FIGS. 1–3, entrainment separator 52 is composed of two rectangular segments which are oriented at approximately 90 degrees to each other. The gas flows though the two segments of entrainment separator 52 in a generally convergent direction. More specifically, approximately half of the gas flow into the scrubber 10 would flow over each edge 32a and 32b. Each half would pass through an associated spray bank 40, and would then be directed to one or the other segment of entrainment separator 52. Entrainment separator 52 is preferably configured to maintain a convergent gas flow into and out of the separator 52, and toward the outlet 30.

The gas stream is then diverted again in a vertically upward direction through chamber 31 to outlet 30. Alternatively, outlet 30 could be disposed through wall 16 and chamber 31 eliminated. The now purified gas, indicated generally by arrow 63, is discharged to the atmosphere or the like.

It should be noted that the gas stream, as it flows out of the outlet 30, could flow to an induced fan and from there to a stack. Other means for flowing the gas stream into, as well as removing it from scrubber 10 are also within the scope of this invention. While not to be bound by any theory, it is believed that the various flow paths the gas stream is required to take through housing 12 also helps remove such as the contaminants. In the preferred configuration, the gas stream takes at least three right angle turns, one as it enters housing 12 and two to get around the deck 32. An additional right angle turn is required to exit through chamber 31.

Referring now to FIG. 4, one can see a second embodiment of the present invention. In this embodiment, the housing 70 has a generally cylindrical configuration, although the operation of such configuration is substantially similar to that described with respect to the first embodiment. The use of directional spray nozzles and baffles are also within the scope of the second embodiment. In the second embodiment, the gas flows into the inlet 72, and fans out across the deck 75 as indicated by arrows 76. When it reaches the edge 78 of deck 75, it flows from a first upper section to a second lower section. Note that edge 78 forms a substantially semi-circular or arcuate flow through channel 79 between the upper and lower sections. Edge 78 could also be constructed of substantially straight segments joined together so as to approximate a curve. Arcuate channel 79 is believed to promote even flow from the first section to the second section. Water sprays are used to treat the gas in a spray zone formed in the lower section by a series of spray nozzle banks 81 as described above with reference to banks 40. Note, that spray banks 81a are located in the lower section of the housing 70 beneath the flow through channel 79. Spray banks 81a are preferably located beneath the edge 78 and extend at an angle toward the inner periphery of housing 70.

Spray banks 81, in addition to treating the gas, also encourage it to flow horizontally through the second section of the housing 70 in a converging direction toward entrainment separator 83. Entrainment separator 83 is comprised on a series of sections configured to maintain converging gas flow toward outlet 74. With a cylindrical housing 70, the entrainment separator preferably has a generally circular configuration. After the gas flows through the entrainment separator 83, it exits through outlet 74.

Reference is now made to FIG. 5 which shows a third embodiment of the present invention. The third embodiment also contemplates the use of directional sprays and baffles, as well as the use of a spray nozzle bank angularly disposed to aid in directing the gas as it flows through the different sections of the housing. In the third embodiment, the gas stream flows in through inlet 80, and then through the spray zone created by spray banks 86. The gas stream then flows from the first section 88 to the second section 90 where the entrainment separator 84 is located. Note the placement of spray bank 86a which helps the gas to flow into the second section 90. From there the gas stream flows across deck 92 and out of the housing through outlet 82. One can see that in this embodiment, the gas inlet 80 and outlet 82 are generally interchanged from that discussed with respect to the first embodiment, and the entrainment separator 84 is in the second section 90, while the spray bank 86 is located in the first section 88. However, it should be understood that outlet 82 could be located on the same wall as inlet 80 such that inlets 80 and 82 are both horizontal.

While the presently preferred embodiments have been described above, it will be apparent to one of ordinary skill in the art that other configurations are also within the scope of the present invention. For example, the gas inlet and outlet may be of other shapes such as rectangular and the like, rather than circular. The gas inlet 28 may be located on various sides of the scrubber shell rather than on the top as is the case in the first embodiment. Thus the inlet 28 and outlet 30 could both be mounted so that the gas flow would be horizontal through both. The flat deck 32 may be pitched so as to cause liquid to flow more readily from the first section 36 to the second section 38, or a drain pipe or downcomer arrangement between the first and second sections can also be used. In many cases, the gas flow will cause sufficient flow of liquid even along a horizontal deck. The deck may also be fitted with an overflow weir so as to cause a pool of liquid to be retained in the area where the gas inlet impinges on the deck 32.

In the preferred embodiment, edges 32a and 32b are surrounded by and disposed inwardly from the inner surface of walls 20 and 22 of housing 12. Other configurations for the deck 32 and housing 12 could also be used. Different entrainment separator configurations are also within the scope of this invention, and the entrainment separator can be located external to the housing 12 as well. With respect to the various spray nozzle banks 40, in the preferred embodiment, conduits 41 are such that there is an approximate separation between each bank of approximately 4 to 12 inches. Distance between adjacent spray nozzles 43 on each bank is approximately one foot. It is understood, however, that other configurations for the conduits 41, nozzles 43 and banks 40 are within the scope of the present invention. The present invention also contemplates the use of a particle or drop charger 100 (see FIG. 1). Particle charger 100 can be any of the well known corona discharge devices or other means well known in electrostatic precipitation. Particle charger 100 is used to electrically charge the contaminants in the gas stream as the stream enters housing 12 which further aids in contaminant removal. Also useful in contaminant removal is to charge the drops of liquid from sprays 46, 48 and/or 49. Preferably, an induction charging system or other similar system is used to charge the drops.

This invention, therefore, is not intended to be limited to any particular embodiment or other characteristics herein disclosed.

We claim:

1. A preformed-spray scrubber comprising:
   a housing defining both a convergent and divergent gas flow path therethrough and having a gas stream inlet and a gas stream outlet, said housing divided into first and second sections by a deck forming a flow-through channel adjacent a first end thereof for gas flow from said first section to said second section, said inlet located on said housing adjacent a second end of said deck such that gas flows into said first section, across said deck, from said second end to said first end thereof, in a divergent flow path, through said flow-through channel into said second section, through said second section in a convergent flow path and out of the housing through said outlet; and
   a series of spray nozzle banks disposed in said housing and configured such that the spray from said nozzles aids in directing the gas stream from said first section into said second section.

2. A preformed-spray scrubber according to claim 1 wherein said spray nozzle banks are configured to aid in changing the direction of the gas stream as the gas stream flows from said first section into said second section.

3. A preformed-spray scrubber according to claim 1 including an entrainment separator disposed in said second section between said spray nozzle banks and said outlet.

4. A preformed-spray scrubber according to claim 1 including baffle means for directing said gas stream through said first section and into said second section.

5. A preformed-spray scrubber according to claim 1 wherein said series of spray nozzle banks are disposed in said first section.

6. A preformed-spray scrubber according to claim 1 wherein said series of spray nozzle banks are disposed in said second section.

7. A preformed-spray scrubber according to claim 1 wherein said flow-through channel has a generally angular configuration.

8. A preformed-spray scrubber according to claim 1 wherein said flow-through channel has a generally arcuate configuration.

9. A preformed-spray scrubber comprising:
- a housing defining both a convergent and divergent gas flow path therethrough and having a gas stream inlet and a gas stream outlet, said housing divided into first and second sections by a deck forming a flow-through channel adjacent a first end thereof for gas flow from said first section to said second section, said inlet located on said housing adjacent a second end of said deck such that said gas stream flows into said first section, across said deck from said second end to said first end thereof in a divergent flow path, through said flow-through channel into said second section, through said second section in a convergent flow path and out of the housing through said outlet;
- means for spraying said gas stream with a liquid as it enters said housing; and
- a series of spray nozzle banks disposed in said second section of said housing beneath said deck, said series of spray nozzle banks configured such that the spray from said nozzles aids in changing the direction of the gas stream as the gas stream flows from said first section to said second section and in promoting uniform flow of said gas stream through said second section.

10. A preformed-spray scrubber according to claim 9 wherein said inlet has an axis which is perpendicular to said deck.

11. A preformed-spray scrubber according to claim 9 wherein an entrainment separator is disposed in said second section between said spray nozzle banks and said outlet.

12. A preformed-spray scrubber according to claim 9 including means for electrically charging the spray from said spraying means.

13. A preformed-spray scrubber having special utility in the removal of gas and particulate contaminants from a gas stream, comprising:
- a housing defining a flow path therethrough and having a gas stream inlet and a gas stream outlet, said housing including a top and bottom and divided into first and second sections by a generally flat deck, a portion of said deck disposed inwardly from an interior surface of said housing thereby forming a flow-through channel for gas flow from said first section into said second section, and wherein said inlet and outlet are located such that gas flows into said first section, across said deck, through said flow-through channel, and into said second section;
- a series of spray nozzle banks disposed in said housing and configured such that the spray from said nozzles aids in directing the gas stream from the first section into the second section and in promoting uniform flow of said gas stream through said second section, and further wherein at least one of said series of spray nozzle banks is located adjacent said flow-through channel in the second section of the housing and is inclined towards the bottom of said housing; and
- an entrainment separator disposed along said flow path.

14. A preformed-spray scrubber according to claim 13 wherein said entrainment separator is disposed in said second section between said spray nozzle banks and said outlet.

15. A preformed-spray scrubber according to claim 13 including baffle means for directing said gas stream through said first section and into said second section.

16. A preformed-spray scrubber according to claim 13 including means for electrically charging the contaminants in the gas stream as the gas stream enters the inlet.

17. A preformed-spray scrubber according to claim 13 wherein said flow-through channel has a generally angular configuration.

18. A preformed-spray scrubber according to claim 13 wherein said flow-through channel has a generally arcuate configuration.

19. A preformed-spray scrubber according to claim 13 wherein said housing has a generally cylindrical configuration, and said portion of said deck which forms said flow-through channel terminates in a generally arcuate edge.

20. A method for removing finely divided contaminants from a gas stream comprising the steps of:
- (a) providing a housing having a gas stream inlet and a gas stream outlet, said housing divided into first and second sections by a deck forming a flow passageway from said first section to said second section;
- (b) directing a stream of a gas containing finely divided contaminants into said first section of said housing through said inlet;
- (c) impinging said gas stream and said contaminants on said deck thereby removing a portion of said contaminants from said gas stream;
- (d) directing said gas stream over said deck in a generally divergent flow path and through said passageway into said second section;
- (e) removing an additional portion of said contaminants by spraying said gas with a liquid as said gas stream flows through said housing;
- (f) directing said gas stream through said second section in a generally convergent flow path; and
- (g) directing the gas stream from which said contaminants have now been removed out of said housing through said outlet.

21. A method according to claim 20 wherein step (e) occurs in said second section.

22. A method according to claim 21 including, prior to step (c), the step of pretreating said gas stream with a liquid spray as said gas stream enters said housing.

23. A method according to claim 22 including the step of electrically charging said liquid spray used to pretreat said gas stream so as to aid in contaminant removal.

24. A method according to claim 20 including, prior to step (c), the step of:
- spraying said gas stream with a liquid as said gas stream flows into said first section.

25. A method according to claim 20 including the steps of:
- providing an entrainment separator in said housing; and flowing said gas stream through said entrainment separator whereby an additional portion of said contaminants are removed from said gas stream.

26. A method according to claim 25 wherein step (e) occurs in said second section, and said entrainment separator is located in said second section.

27. A method according to claim 20 including the step of electrostatically charging the contaminants in said gas stream as said gas stream flows into said housing so as to aid in contaminant removal.

* * * * *